US007113655B2

(12) United States Patent
Narita

(10) Patent No.: US 7,113,655 B2
(45) Date of Patent: Sep. 26, 2006

(54) IMAGE PROCESSING APPARATUS

(75) Inventor: Atsushi Narita, Tokyo (JP)

(73) Assignee: Sony Corporation, Tokyo (JP)

( * ) Notice: Subject to any disclaimer, the term of this patent is extended or adjusted under 35 U.S.C. 154(b) by 826 days.

(21) Appl. No.: 10/366,465

(22) Filed: Feb. 14, 2003

(65) Prior Publication Data

US 2003/0156220 A1 Aug. 21, 2003

(30) Foreign Application Priority Data

Feb. 18, 2002 (JP) .......................... P2002-039605

(51) Int. Cl.
*G06K 9/60* (2006.01)
*H02H 3/05* (2006.01)
*H04N 5/14* (2006.01)

(52) U.S. Cl. ........................................ 382/305; 716/18

(58) Field of Classification Search ................ 382/305; 365/154, 205, 189.01, 189.08, 230.03; 716/8, 716/10, 17, 18; 257/760, 778, 787, 792; 438/211, 235, 238–244, 253, 254
See application file for complete search history.

(56) References Cited

U.S. PATENT DOCUMENTS 3,681,763 A * 8/1972 Meade et al. .......... 365/189.01
3,774,176 A * 11/1973 Stein et al. ................. 365/205
3,986,173 A * 10/1976 Baitinger et al. ........... 365/154
4,675,849 A * 6/1987 Kinoshita ............. 365/189.08
4,849,904 A * 7/1989 Aipperspach et al. ......... 716/17
5,208,774 A * 5/1993 Shibue .................. 365/189.08
5,301,162 A * 4/1994 Shimizu ................ 365/230.03
5,814,894 A * 9/1998 Igarashi et al. ............. 257/787
6,376,304 B1 * 4/2002 Matsuoka et al. .......... 438/253
6,532,579 B1 * 3/2003 Sato et al. ...................... 716/8
2002/0003305 A1 * 1/2002 Umakoshi et al. .......... 257/760
2003/0156220 A1 * 8/2003 Narita ........................ 348/571

* cited by examiner

*Primary Examiner*—Amir Alavi
(74) *Attorney, Agent, or Firm*—Rader, Fishman & Grauer PLLC; Ronald P. Kananen

(57) ABSTRACT

An image processing apparatus enabling alpha blending or other image processing during bit block transfer (bitblt), wherein the selector 52 selects one of the primitive data S143, the image data S12 and the image data S147*a* that are used for the host-local transfer, and outputs the data to the alpha blend circuit 53. According to the control signal S55, the alpha blend circuit 53 turns on or turns off alpha blending. The selector 54 selects either the image data S139 or the image data S53 and writes the data to the DRAM 147.

15 Claims, 4 Drawing Sheets

IMAGE PROCESSING APPARATUS

BACKGROUND OF THE INVENTION

1. Field of the Invention

The present invention relates to an image processing apparatus, particularly, an imaging processing apparatus characterized by processing in data transfer between memories.

2. Description of the Related Art

Computer graphics is frequently utilized in various CAD (Computer Aided Design) systems, amusement equipments, or others. Particularly, along with the progress in image processing technology in recent years, systems using three-dimensional computer graphics are rapidly and widely spread.

Three-dimensional computer graphics involves frequent access to storage circuits like DRAM in order to perform real-time processing of a large amount of image data. For this purpose, rendering circuits and DRAMs are built in a semiconductor chip. A rendering circuit, for example, includes an alpha blend circuit in addition to a texture circuit to carry out texture processing. When writing image data to a DRAM, for each pixel data, the alpha blend circuit mixes the data to be written (source data) and the data read from a destination address for writing (destination data), based upon an alpha data selected from either the source data or the destination data, and carries out alpha blending to write the mixed data to the above address.

Further, a rendering circuit carries out bit block transfer (bitblt) that includes local transfer, namely, data transfer within the DRAM, and host-local transfer, namely, data transfer from an external memory outside the semiconductor chip to the DRAM.

In a rendering circuit of the related art, the path for data transfer in the above bitblt is configured to be independent from the alpha blend circuit.

Recently, the demand for image processing at a higher speed has increased, and it is required to perform alpha blending or other image processing during data transfer in bitblt.

However, a rendering circuit of the related art cannot meet this requirement, because in a rendering circuit of the related art, as shown above, the path for data transfer in bitblt is configured independently from the alpha blend circuit.

SUMMARY OF THE INVENTION

An object of the present invention is to provide an image processing apparatus able to perform alpha blending or other image processing in the bit block transfer (bitblt).

To attain the object, according to a first aspect of the present invention, there is provided an image processing apparatus comprising a first interface for inputting a first image data from a calculation processing circuit outside a semiconductor chip and inputting a second image data from an external storage circuit outside the semiconductor chip, a semiconductor storage circuit, a selecting circuit for selecting and outputting one of the first image data, the second image data, and a third image data read from the semiconductor storage circuit, an image processing circuit for selecting and performing either processing the image data inputted from the selecting circuit to generate and output an image data or outputting an image data inputted from the selecting circuit, and a second interface for outputting the image data from the image processing circuit to the semiconductor storage circuit, wherein the first interface, the semiconductor storage circuit, the selecting circuit, the image processing circuit, and the second interface are formed in the same semiconductor chip.

The function of the first image processing apparatus is as follows.

First, an explanation will be made of the function when processing the first image data inputted from the calculation processing circuit and writing the data to the semiconductor storage circuit.

In this case, the first image data from the calculation processing circuit is inputted to the first interface. Then, the selecting circuit selects the first image data and outputs it to the image processing circuit. After that, the image processing circuit processes the first image data and outputs the data to the second interface. Then, the second interface outputs the inputted first image data to the semiconductor storage circuit.

Next, the function of the first image processing apparatus will be presented when image data are transferred from the external storage circuit to the semiconductor storage circuit without image processing being performed during data transfer.

In this case, the first interface inputs the second image data from the external storage circuit outside the semiconductor chip formed by the constituent elements of the image processing apparatus. Then, the selecting circuit selects the inputted second image data and outputs it to the image processing circuit. After that, the image processing circuit outputs the image data inputted from the selecting circuit without image processing being performed. Then, the second interface outputs the image data inputted from the image processing circuit to the semiconductor storage circuit.

Next, the function of the first image processing apparatus will be presented when image data are transferred from the external storage circuit to the semiconductor storage circuit while image processing is being performed during data transfer.

In this case, the first interface inputs the second image data from the external storage circuit. Then, the selecting circuit selects the inputted second image data and outputs it to the image processing circuit. After that, the image processing circuit processes the second image data inputted from the selecting circuit and outputs it. Then, the second interface outputs the image data inputted from the image processing circuit to the semiconductor storage circuit.

Next, the function of the first image processing apparatus will be presented when image data are transferred within the semiconductor storage circuit without image processing being performed during data transfer.

The third image data read from the semiconductor storage circuit is inputted to the selecting circuit. Then, the selecting circuit selects the third image data and outputs it to the image processing circuit. After that, the image processing circuit outputs the third image data inputted from the selecting circuit without image processing being performed. Then, the second interface outputs the image data inputted from the image processing circuit to the semiconductor storage circuit.

Next, the function of the first image processing apparatus will be presented when image data are transferred within the semiconductor storage circuit while image processing is being performed during data transfer.

The third image data read from the semiconductor storage circuit is inputted to the selecting circuit. Then, the selecting circuit selects the third image data and outputs it to the image processing circuit. After that, the image processing circuit outputs the third image data inputted from the selecting circuit while image processing is being performed. Then, the second interface outputs the image data inputted from the image processing circuit to the semiconductor storage circuit.

Preferably, in the first image processing apparatus, the second interface inputs an image data read from a write address of the semiconductor storage circuit and outputs the same data to the image processing circuit, and the image processing circuit performs image processing using the image data inputted from the second interface and the image data inputted from the selecting circuit and generates and outputs an image data.

In addition, the first image processing apparatus further comprises a texture processing circuit for texture processing of the image data outputted from the calculation processing circuit and outputting the image data as the first image data to the first interface.

Further, in the first image processing apparatus, the image processing circuit performs alpha blending using the image data inputted from the selecting circuit and the image data inputted from the second interface.

To attain the above object, according to a second aspect of the present invention, there is provided a second image processing apparatus comprising an interface for inputting a first image data from a calculation processing circuit outside a semiconductor chip and inputting a second image data from an external storage circuit outside the semiconductor chip, a semiconductor storage circuit, a first selecting circuit for selecting and outputting either the second image data or a third image data read from the semiconductor storage circuit, a second selecting circuit for selecting and outputting either the first image data or the image data selected by the first selecting circuit, an image processing circuit for processing the image data inputted from the second selecting circuit and generating an image data, and a third selecting circuit for selecting and outputting either the image data generated by the image processing circuit or the image data selected and outputted by the first selecting circuit, wherein the interface, the semiconductor storage circuit, the first selecting circuit, the second selecting circuit, the third selecting circuit, and the image processing circuit are formed in the same semiconductor chip.

The function of the second image processing apparatus is as follows.

First, an explanation will be made of the function when processing the first image data inputted from the calculation processing circuit and writing the data to the semiconductor storage circuit.

In this case, the first image data from the calculation processing circuit is inputted to the interface. Then, the second selecting circuit selects the inputted first image data and outputs it to the image processing circuit. After that, the image processing circuit processes the inputted first image data and outputs the data to the third selecting circuit. Then, the third selecting circuit selects the inputted first image data and outputs it to the semiconductor storage circuit.

Next, the function of the second image processing apparatus will be presented when image data are transferred from the external storage circuit to the semiconductor storage circuit without image processing being performed during data transfer.

The second image data from the external storage circuit is inputted to the first selecting circuit via the interface. Then, the first selecting circuit selects the inputted second image data and outputs it to the third selecting circuit. After that, the third selecting circuit outputs the inputted second image data to the semiconductor storage circuit.

Next, the function of the second image processing apparatus will be presented when image data are transferred from the external storage circuit to the semiconductor storage circuit while image processing is being performed during data transfer.

The second image data from the external storage circuit is inputted to the first selecting circuit via the interface. Then, the first selecting circuit selects the inputted second image data and outputs it to the second selecting circuit. Then, the second selecting circuit selects the inputted second image data and outputs it to the image processing circuit.

After that, the image processing circuit processes the inputted second image data and outputs the data to the third selecting circuit. Then, the third selecting circuit selects the processed second image data and outputs it to the semiconductor storage circuit.

Next, the function of the second image processing apparatus will be presented when image data are transferred within the semiconductor storage circuit without image processing being performed during data transfer.

The image data read from the semiconductor storage circuit is inputted to the first selecting circuit. Then, the first selecting circuit selects the inputted image data and outputs it to the third selecting circuit. After that, the third selecting circuit selects and outputs the inputted image data to the semiconductor storage circuit.

Next, the function of the second image processing apparatus will be presented when image data are transferred within the semiconductor storage circuit while image processing is being performed during data transfer.

The third image data read from the semiconductor storage circuit is inputted to the first selecting circuit. Then, the first selecting circuit selects the inputted third image data and outputs it to the second selecting circuit, and then the second selecting circuit selects the inputted third image data and outputs it to the image processing circuit. After that, the image processing circuit outputs the third image data inputted from the third selecting circuit while image processing is being performed. Then, the third selecting circuit selects the inputted third image data and outputs to the semiconductor storage circuit.

To attain the above object, according to a third aspect of the present invention, there is provided a third image processing apparatus comprising a calculation processing circuit, an external storage circuit, and a rendering circuit, wherein, the rendering circuit includes a first interface for inputting a first image data from the calculation processing circuit and inputting a second image data from the external storage circuit, a semiconductor storage circuit, a selecting circuit for selecting and outputting one of the first image data, the second image data, and a third image data read from the semiconductor storage circuit, an image processing circuit for selecting and performing either processing the image data inputted from the selecting circuit to generate and output an image data or outputting an image data inputted from the selecting circuit, and a second interface for outputting the image data from the image processing circuit to the semiconductor storage circuit; wherein the first interface, the semiconductor storage circuit, the selecting circuit the image processing circuit, and the second interface are formed in the same semiconductor chip.

The function of the third image processing apparatus is basically the same as that of the first image processing apparatus.

To attain the above object, according to a fourth aspect of the present invention, there is provided a fourth image processing apparatus comprising a calculation processing circuit, an external storage circuit, and a rendering circuit, wherein, the rendering circuit includes an interface for inputting a first image data from the calculation processing circuit and inputting a second image data from the external storage circuit, a semiconductor storage circuit, a first selecting circuit for selecting and outputting either the second image data or a third image data read from the semiconductor storage circuit, a second selecting circuit for selecting and outputting either the first image data or the image data selected by the first selecting circuit, an image processing circuit for processing the image data inputted from the second selecting circuit and generating an image data, and a third selecting circuit for selecting and outputting either the image data generated by the image processing circuit or the image data selected and outputted by the first selecting circuit, wherein the interface, the semiconductor storage circuit, the first selecting circuit, the second selecting circuit, the third selecting circuit, and the image processing circuit are formed in the same semiconductor chip.

The function of the fourth image processing apparatus is basically the same as that of the second image processing apparatus.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Related Art of the Invention

First, an explanation will be made of an image processing apparatus showing the related out of the invention.

Figure 1:
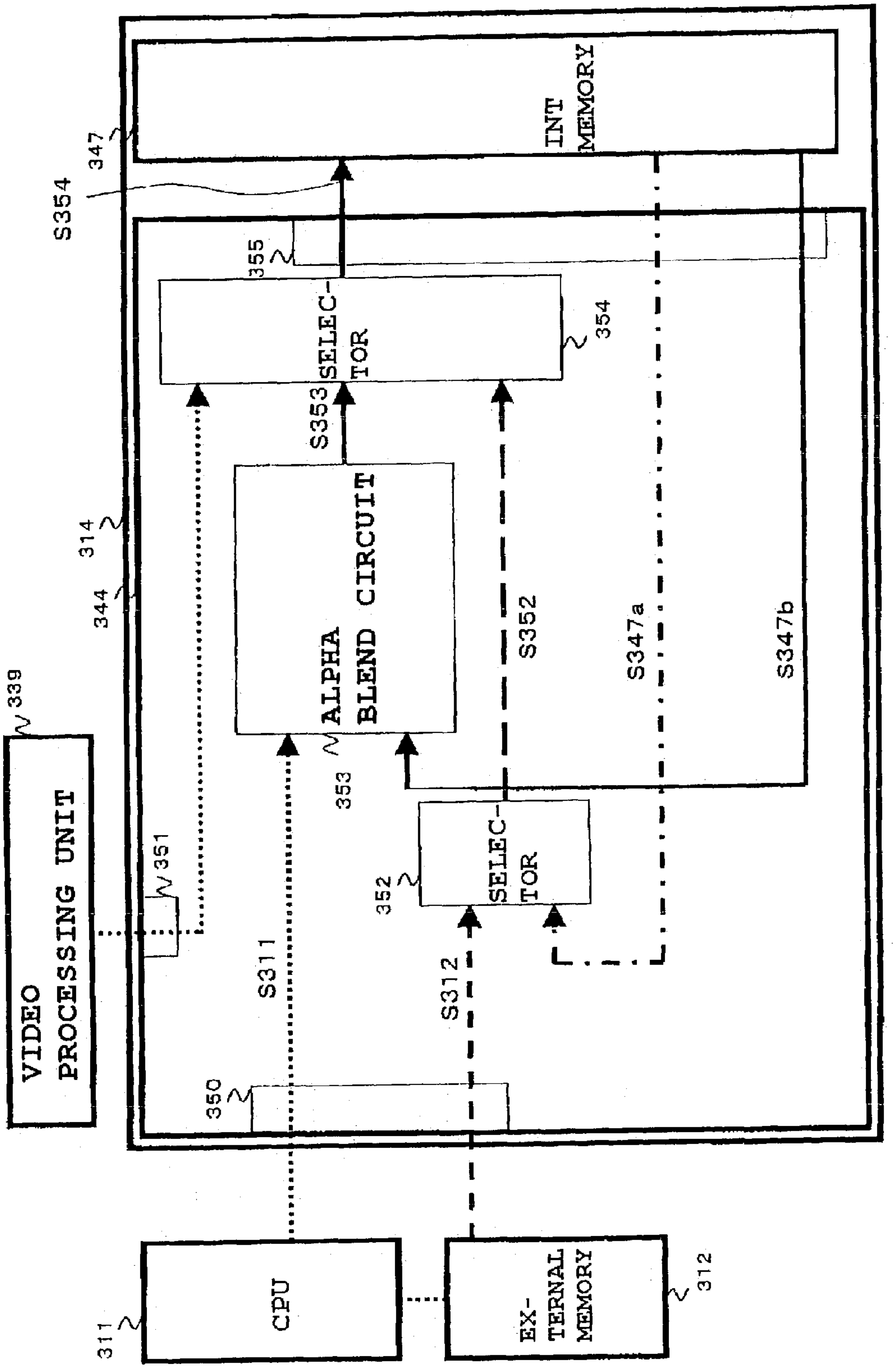
FIG. 1 is a view of a configuration of an image processing apparatus showing the related out the present invention.

FIG. 1 is a view of a configuration of an image processing apparatus 301 showing the related out of the present invention.

As shown in FIG. 1, for example, the image processing apparatus 301 comprises a CPU 311, a main memory 312, a video processing unit 339, and a rendering circuit 314.

The rendering circuit 314 includes a memory I/F circuit 344 and a DRAM 347.

Note that, there is a not-shown texture processing circuit at the front stage of the memory I/F circuit 344 and after the CPU 311.

The rendering circuit 314, for example, includes an I/F 350, an I/F 351, a selector 352, an alpha blend circuit 353, a selector 354 and an I/F 355.

As shown in FIG. 1, in the image processing apparatus 301, when performing alpha blending, the image data outputted from the CPU 311 becomes a primitive data S311 after texture processing or so on, and the primitive data S311 is inputted to the alpha blend circuit 353 through the I/F 350.

Further, a destination data S347*b* read out from a write address of the DRAM 347 and an alpha data are inputted to the alpha blend circuit 353.

Then, in the alpha blend circuit 353, the primitive source data S311 and the destination data S347*b* are mixed according to a mixing ratio given by the alpha data, and an image data S353 is generated.

Then, the image data S353 is selected by the selector 354 and is written to the write address of the DRAM 347 through the I/F 355.

Further, in the image processing apparatus 301, when performing local transfer (bitblt) in which data is transferred locally within the DRAM 347, the image data read from a source address for transfer is inputted to the selector 352 through the I/F 355, selected by the selector 354 and outputted to the selector 354. Furthermore, this image data is selected by the selector 354, and is written to a destination address for transfer in the DRAM 347 via the I/F 355.

In addition, in the image processing apparatus 301, when performing host-local transfer (bitblt), namely, data is transferred from the main memory 312 to the DRAM 347, an image data S312 read from the main memory 312 is inputted to the selector 352 through the I/F 350. The image data S312 is selected by the selector 352 and outputted to the selector 354. Furthermore, the image data S312 is selected by the selector 354 and written to the destination address for transfer in the DRAM 347 via the I/F 355.

In the image processing apparatus 301 mentioned above, because the path for data transfer in bitblt is configured to be independent from the alpha blend circuit 353, alpha blending cannot be performed during data transfer in bitblt.

First Embodiment

The present embodiment is related to an embodiment of the first and third aspects of the invention.

Figure 2:
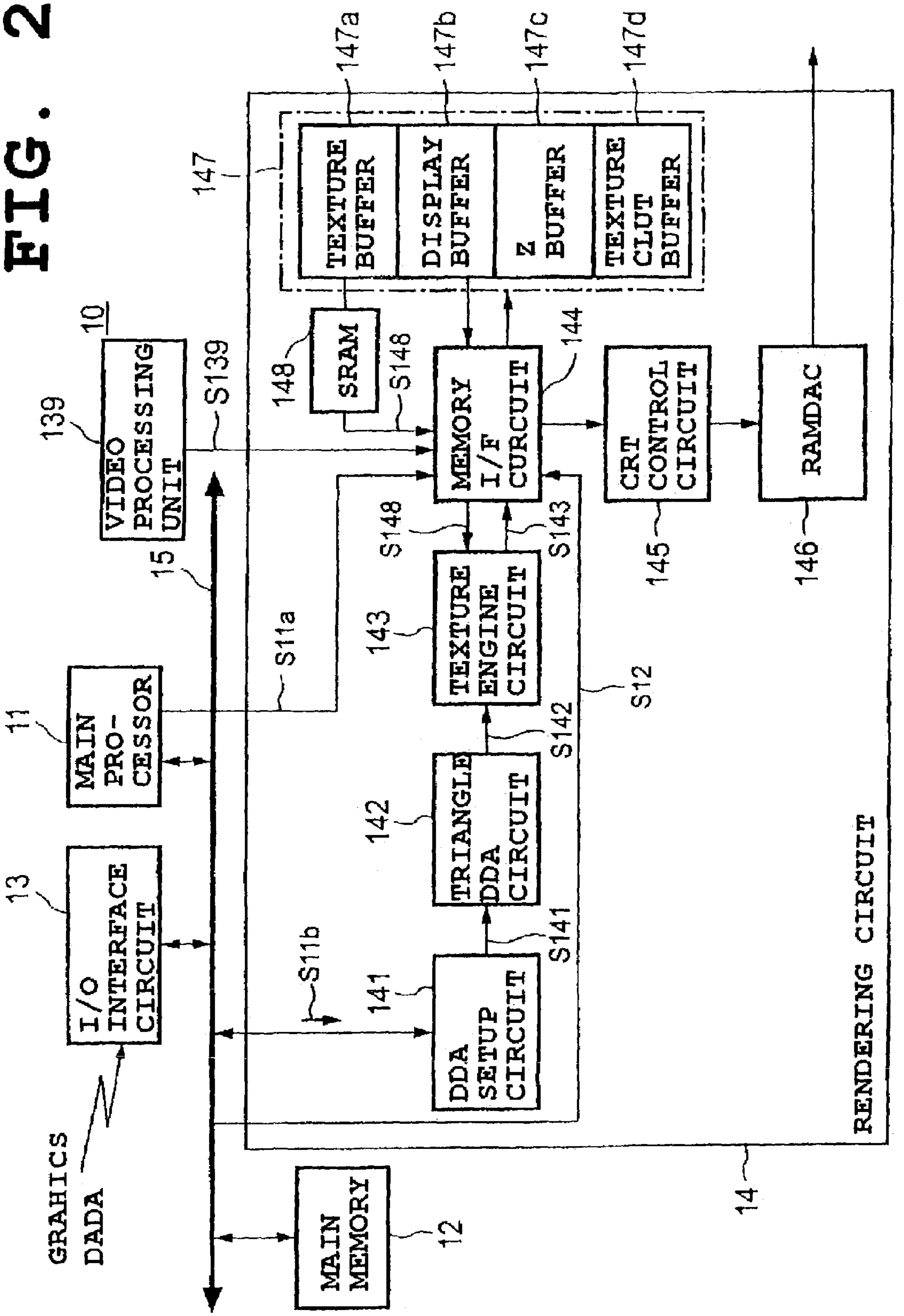
FIG. 2 is a view of an overall configuration of a three-dimensional computer graphics system related to an embodiment of the present invention.

FIG. 2 is a view of a configuration of a three-dimensional computer graphics system 10 of the present embodiment.

The three-dimensional computer graphics system 10 describes a solid model by combining triangles (polygons) used as unit figures, and it decides the color of each pixel on its screen by drawing the polygons and performs rendering for polygons displayed on its display.

Further, in the three-dimensional computer graphics system 10, in addition to coordinates (x, y) representing positions in a plane, the coordinate Z representing depth also is used so as to describe three-dimensional bodies; and one point in the three-dimensional space is determined by three coordinates (x, y, z).

As shown in FIG. 2, in the three-dimensional computer graphics system 10, for example, the CPU 11, the main memory 12, the I/O interface circuit 13, and the rendering circuit 14 are connected via the main bus 15.

Further, the three-dimensional computer graphics system 10 has a video processing unit 139.

Here, the three-dimensional computer graphics system 10 corresponds to the third image processing apparatus of the invention, and the rendering circuit 14 corresponds to the first image processing apparatus of the invention.

In addition, the CPU 11 corresponds to the calculation processing circuit, and the main memory 12 corresponds to the external storage circuit of the present invention.

Next, the function of each constituent element will be explained.

The CPU 11, for example, reads necessary graphic data from the main memory 12 in accordance with the process status of applications, performs geometric processing like clipping, lighting, or others for the graphic data, and generates a polygon-rendering data S11*b*. The CPU 11 outputs the polygon-rendering data S11*b* to the rendering circuit 14 through the main bus 15.

In addition, the CPU 11 controls image processing in the rendering circuit 14.

Specifically, the CPU 11 generates a control signal S11*a* and outputs it to the rendering circuit 14, and thereby the CPU 11 switches the selection state of a selecting circuit in the memory I/F circuit 144 of the rendering circuit 14, as described afterwards, to control whether bitblt or alpha blending will be performed or not.

The I/O interface circuit 13 inputs polygon-rendering data from the outside, when necessary, and outputs the data to the rendering circuit 14 through the main bus 15.

The polygon-rendering data includes data (x, y, z, R, G, B, alpha, s, t, q) for each vertex of a polygon.

Here, (x, y, z) represents the three-dimensional coordinates of a vertex of the polygon, and (R, G, B, alpha) represents the red, green, blue luminance at the above coordinates and their blending values in alpha blending, respectively.

Regarding data (s, t, q), (s, t) represents homogeneous coordinates of a corresponding texture, and q represents a homogeneous term. Further, texture coordinates (u, v) can be obtained by multiplying the texture sizes USIZE and VSIZE to "s/q" and "t/q", respectively. The texture data stored in the texture buffer 147*a* is accessed using the texture coordinates (u, v).

Namely, a polygon-rendering data includes physical coordinates and color and texture data of each vertex of a triangle.

Next, the rendering circuit 14 will be explained in detail.

As shown in FIG. 2, the rendering circuit 14 comprises a digital-differential-analyzer (DDA) setup circuit 141, a triangle DDA circuit 142, a texture engine circuit 143, a memory interface (I/F) circuit 144, a CRT control circuit 145, a RAMDAC circuit 146, a DRAM 147, and a SRAM (Static RAM) 148, and these are formed on a single semiconductor chip. Namely, the rendering circuit 14 has a DRAM embedded structure.

The DRAM 147 corresponds to the semiconductor storage circuit of the present invention.

DRAM147

The DRAM 147 functions as a texture buffer 147*a*, a display buffer 147*b*, a z buffer 147*c*, and a texture color look-up table (CLUT) buffer 147*d*.

In DRAM 147, in order to store many data, the indices of index colors and their values in the color look-up table are stored in the texture CLUT buffer 147*d*.

The indices and their values in the color look-up table are used in the texture processing. Specifically, each color of R, G, B of a texture element is usually described by eight bits, and thus a texture element is totally 24 bits, but this increases the amount of data greatly. For this reason, for example, one color from 256 colors is selected beforehand, and this color data is used in the texture processing. Due to this, in the case of 256 colors, each texture element can be described by eight bits. Although a table for transformation from an index to a real color turns necessary, more compact texture data are still obtainable for a higher and higher texture resolution.

As a result, compressing the texture data becomes possible and the internal DRAM can be utilized more efficiently.

Furthermore, the depth information of an object to be drawn is stored in the DRAM 147 in order to process the hidden surfaces thereof in parallel at the same time with drawing.

As for the methods for storing the display data, the depth data, and the texture data, the display data is stored sequentially from the beginning of a memory block, the depth data is stored next, in the remaining empty region, and each type of texture data is stored in a sequential address space. Therefore, the texture data can be stored efficiently.

DDA setup circuit 141

The DDA setup circuit 141 performs setup calculations to calculate the differences along the sides of a triangle and in the horizontal direction for data (z, R, G, B, alpha, s, t, q) represented by the polygon-rendering data S11*b*, before the later triangle DDA circuit 142 performs linear interpolations using vertex values of a triangle in a physical coordinate system to find the color and depth information of each pixel inside the triangle.

In the setup calculation, specifically, the desired variation of a value in the case of unit length movement is calculated by using the values of the start point, the end point, and the distance between these two points.

The DDA setup circuit 141 outputs the calculated variation data S141 to the triangle DDA circuit 142.

Triangle DDA circuit 142

The triangle DDA circuit 142 calculates the linearly interpolated data (z, R, G, B, alpha, s, t, q) for each pixel inside the triangle by using the variation data S141 inputted from the DDA setup circuit 141.

The triangle DDA circuit 142 outputs data (x, y) and data (z, R, G, B, alpha, s, t, q) at coordinates (x, y) for each pixel to the texture engine circuit 143 as the DDA data (interpolation data) S142.

For example, the triangle DDA circuit 142 outputs to the texture engine circuit 143 the DDA data S142 of eight pixels (2×4) located in a rectangle and processed in parallel.

Texture engine circuit 143

The texture engine circuit 143 calculates s/q, t/q, and the texture coordinates (u, v) and reads the (R, G, B) data from the texture buffer 147*a* by means of pipeline.

For example, the texture engine circuit 143 processes eight pixels (2×4) located in a rectangle in parallel.

The texture engine circuit 143 divides the s data by the q data and the t data by the q data.

In the texture engine circuit 143, for example, eight not-shown division circuits are provided, and the division calculations of s/q and t/q for eight pixels are made at the same time.

Further, the texture engine circuit 143 multiplies the division results s/q and t/q by the texture sizes USIZE and VSIZE, respectively, to generate the texture coordinates (u, v).

The texture engine circuit 143 outputs a request to the SRAM 148 and the DRAM 147 through the memory I/F circuit 144 to read data including the generated texture coordinates (u, v). By reading the texture data stored in the SRAM 148 or the texture buffer 147*a* through the memory I/F circuit 144, there is obtained (R, G, B) data S148, namely, the texture data stored at a texture address corresponding to data (s, t).

Here, as described above, the texture data included in the texture buffer 147*a* is stored in the SRAM 148.

The texture engine circuit 143 generates new (R, G, B) data by multiplying one by one the (R, G, B) data in the data S148 with the (R, G, B) data in the DDA data S142 from the preceding triangle DDA circuit 142, and it generates a pixel data S143 including the generated (R, G, B) data and the (x, y, z, alpha) included in the DDA data S142.

The texture engine circuit 143 outputs the pixel data S143 to the memory I/F circuit 144.

Note that texture data associated with a number of reduction rates, such as MIPMAP or others, are stored in the texture buffer 147*a*, and which of these reduction rates will be used is decided by a predetermined algorithm for each triangle.

In case of the full color mode, the texture engine circuit 143 directly uses the (R, G, B) data read from the texture buffer 147*a*.

On the other hand, in case of the index color mode, the texture engine circuit 143 reads out the color look-up table (CLUT) prepared beforehand from the CLUT buffer 147*d*, then transfers and stores it to the built-in SRAM, and obtains the (R, G, B) data corresponding to the color index read out from the texture buffer 147*a* using this color look up table.

Memory I/F circuit 144

The memory I/F circuit 144 transfers data locally within the DRAM 147 (local transfer) or transfers data between the main memory 12 and the DRAM 147 (host-local transfer), namely, performs bitblt including the local transfer, the host-local transfer, or others.

In the present embodiment, when transferring data by the above bitblt, the memory I/F circuit 144 can perform alpha blending that is described later.

The memory I/F circuit 144 compares the z data included in the image data (pixel data) S143 inputted from the texture engine circuit 143 with the z data stored in the z buffer 147*c* and makes the judgment whether or not the image that is drawn using the inputted image data S143 is closer to the viewer side than the image written in the display buffer 147*b* last time. If it is true, the z data stored in the z buffer 147*c* is updated by the z data corresponding to the image data S143.

The memory I/F circuit 144 writes the (R, G, B) data stored in the image data S143 to the display buffer 147*b* after alpha blending is performed for the (R, G, B) data, when necessary. Alpha blending will be explained in detail later.

Further, when the memory I/F circuit 144 is requested to read data including the texture coordinates (u, v) from the texture engine circuit 143, it reads the (R, G, B) data S148 stored in the DRAM 147 or the SRAM 148.

When the memory I/F circuit 144 is requested to read a display data from the CRT control circuit 145, it reads out a fixed number of the display data from the display buffer 147*b*, for example, in unit of 8 pixels or 16 pixels.

Next, a configuration associated with alpha blending and bitblt in the memory I/F circuit 144 will be described specifically.

Figure 3:
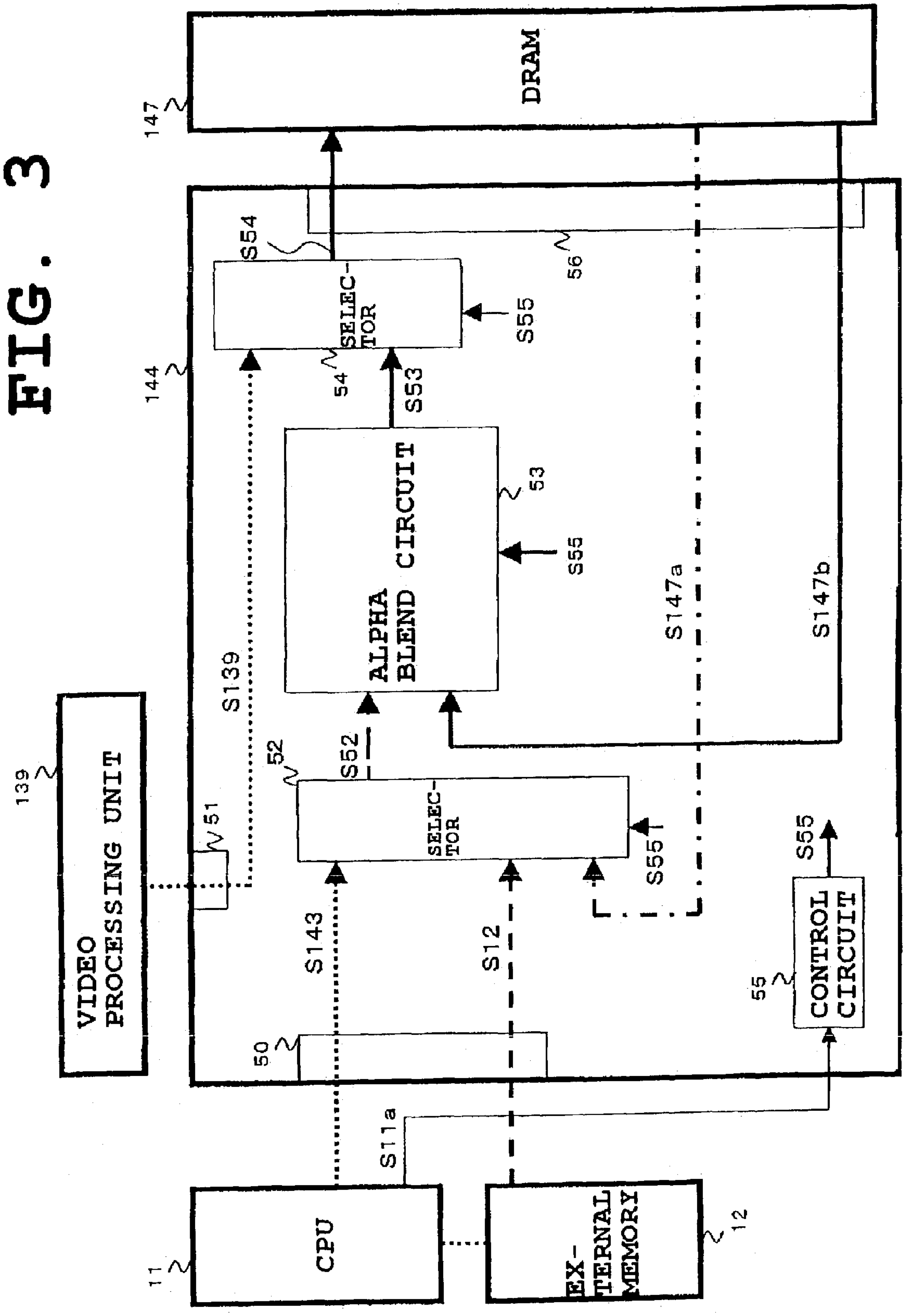
FIG. 3 is a view for explaining a configuration related to alpha blending and bit block transfer (bitblt) in the memory I/F circuit shown in FIG. 2.

FIG. 3 is a view for explaining a configuration associated with alpha blending and bitblt in the memory I/F circuit 144.

For example, as shown in FIG. 3, the memory I/F circuit 144 comprises an I/F (interface) 50, an I/F 51, a selector 52, an alpha blend circuit 53, a selector 54, a control circuit 55 and an I/F 56.

Here, the I/F 50 corresponds to the first interface, the selector 52 corresponds to the selecting circuit, the alpha blend circuit 53 corresponds to the image processing circuit, the I/F 56 corresponds to the second interface, and the control circuit 55 corresponds to the control circuit of the present invention, respectively.

As described above, the polygon-rendering data S11*b* is generated in the CPU 11, and the polygon-rendering data S11*b* is inputted to the rendering circuit 14 through the main bus 15. Then, the polygon-rendering data S11*b* is inputted to the I/F 50 as the primitive data S143 (that is the first image data of the present invention) after being processed in the DDA setup circuit 141, the triangle DDA circuit 142, and the texture engine circuit 143.

The I/F 50 outputs the inputted primitive data S143 to the selector 52.

The image data S12 (that is the second image data of the present invention) read out from the main memory 12 and used for the host-local transfer is inputted to the I/F 50 via the main bus 15.

The I/F 50 outputs the inputted image data S12 to the selector 52.

According to the control signal (selection signal) from the control circuit 55, the selector 52 selects one of the primitive data S143, the image data S12, and the image data S147*a* (that is the third image data of the present invention) read out from the DRAM 147 and used for the local transfer and outputs the selected image data S52 to the alpha blend circuit 53.

When the control signal S55 indicates alpha blend ON, the alpha blend circuit 53 mixes the image data S52 inputted from the selector 52 and the destination data S147*b* read out from a write address of the DRAM 147 according to a mixing ratio given by an alpha data included in the data selected from the image data S52 and the destination data S147*b* to generate an image data S53, and it outputs the data to the selector 54.

When the control signal S55 indicates alpha blend OFF, the alpha blend circuit 53 directly outputs the image data S52 inputted from the selector 52 to the selector 54 as the image data S53.

According to the control signal (selection signal) from the control circuit 55, the selector 54 selects one of the image data S139 inputted from the video processing unit 139 via the I/F 51 and the image data S53 inputted from the alpha blend circuit 53 and writes the selected image data S54 to a write address of the DRAM 147 via the I/F 56.

Note that any other image processing circuits may be used to process the image (filtering) instead of the alpha blend circuit 53.

For example, according to the control signal S11*a* from the CPU 11, the control circuit 55 controls the alpha blend circuit 53 and the selector 54 to have them perform alpha blending and bitblt using the primitive data S143.

In the present embodiment, in bitblt, alpha blending using the transferred image data is performed according to the controlling operation of the control circuit 55.

The operation of the control circuit 55 will be explained in detail in connection with examples of operation of the memory I/F circuit 144.

In the following, operation examples of the memory I/F circuit 144 are presented.

First Example of Operation

In this example of operation, alpha blending using the primitive data S143 will be described.

In this example, according to the control signal S11*a*, the control circuit 55 generates a control signal S55 so that the selector 52 selects the primitive data S143, the alpha blend circuit 53 sets alpha blending on, and the selector 54 selects the image data S53.

Due to this, the primitive data S143 inputted through the I/F 50 is selected by the selector 52 and is outputted to the alpha blend circuit 53 as the image data S52.

In addition, the destination data S147*b* read out from the write address in the DRAM 147 and the alpha data are inputted to the alpha blend circuit 53.

Then, in the alpha blend circuit 53, the image data S52 and the destination data S147*b* are mixed according to a mixing ratio given by the alpha data, and, as a result, an image data S56 is generated.

Then, the image data S53 is selected by the selector 54, and is written to the write address of the DRAM 147 through the I/F 56.

Second Example of Operation

In this example, an explanation will be made of the case in which the host-local transfer from the main memory 12 to the DRAM 147 takes place without alpha blending being performed during data transfer.

The image data S12 read out from a source address for transfer in the main memory 12 is inputted to the selector 52 through the main bus 15 and the I/F 50.

The selector 52 selects the image data S12 and outputs the data to the alpha blend circuit 53 as the image data S52.

Then, without any image processing, the alpha blend circuit 53 outputs the inputted image data S12 (S52) to the selector 54 as the image data S53.

The selector 54 selects the image data S53 and writes the data to the destination address in the DRAM 147 via the I/F 56.

Third Example of Operation

In this example, an explanation will be made of the case in which the host-local transfer from the main memory 12 to the DRAM 147 takes place while alpha blending is being performed during data transfer.

The image data S12 read out from a source address for transfer in the main memory 12 is inputted to the selector 52 through the main bus 15 and the I/F 50.

Then, the selector 52 selects the image data S12 and outputs the data to the alpha blend circuit 53 as the image data S52.

In addition, the destination data S147*b* read out from the write address in the DRAM 147 and the alpha data are inputted to the alpha blend circuit 53.

Then, in the alpha blend circuit 53, the image data S52 and the destination data S147*b* are mixed according to a mixing ratio given by the alpha data, and an image data S56 is generated.

Then, the image data S53 is selected by the selector 54, and is written to the write address of the DRAM 147 through THE I/F 56.

As a result, when image data are transferred from the main memory 12 to the DRAM 147, alpha blending can be performed for both the source image data and the destination data.

Fourth Example of Operation

In this example, an explanation will be made of the case in which data transfer within the DRAM 147 takes place without alpha blending being performed during data transfer.

Then, the image data S147*a* read out from a source address for transfer in the DRAM 147 is inputted to the selector 52 through the I/F 56.

Then, the selector 52 selects the image data S147*a* and outputs the data to the alpha blend circuit 53 as the image data S52.

Then, the alpha blend circuit 53 directly outputs the inputted image data S52 to the selector 54 as the image data S53.

Then, the selector 54 selects the image data S53 and writes the data to the destination address in the DRAM 147 via the I/F 56.

Fifth Example of Operation

In this example, an explanation will be made of the case in which data are transferred within the DRAM 147 while alpha blending is being performed.

The image data S147*a* read out from a source address for transfer in the DRAM 147 is inputted to the selector 52 through the I/F 56.

Then, the selector 52 selects the image data S147*a* and outputs the data to the alpha blend circuit 53 as the image data S52.

Then, the alpha blend circuit 53 directly outputs the inputted image data S52 to the selector 54 as the image data S53.

Then, the selector 54 selects the image data S53 and writes the data to the destination address in the DRAM 147 via the I/F 56.

In addition, the destination data S1147*b* read out from the write address (destination address) in the DRAM 147 and the alpha data are inputted to the alpha blend circuit 53.

Then, in the alpha blend circuit 53, the image data S52 and the destination data S147*b* are mixed according to a mixing ratio given by the alpha data, and an image data S56 is generated.

Then, the image data S53 is selected by the selector 54 and is written to the write address of the DRAM 147 through the I/F 56.

As a result, when image data is transferred within the DRAM 147, alpha blending can be performed for both the source image data and the destination data.

CRT control circuit 145

The CRT control circuit 145 generates a display address to be displayed on a not-shown CRT in synchronization with given horizontal and vertical synchronization signals, and it outputs a request to the memory I/F circuit 144 to read data including the display data from the display buffer 147*b*. According to the request, the memory I/F circuit 144 reads out a fixed number of the display data from the display buffer 147*b*. The CRT control circuit 145 has a built-in FIFO (First In First Out) circuit for storing the display data read out from the display buffer 147*b*, and it outputs the RGB indices to the RAMDAC circuit 146 at certain time intervals.

RAMDAC circuit 146

The RAMDAC circuit 146 stores the R, G, B data each corresponding to an index value and sends digital R, G, B data corresponding to the RGB index values inputted from the CRT controller circuit 145 to a not-shown D/A converter (Digital/Analog Converter) to generate analog R, G, B data. The RAMDAC circuit 146 outputs the generated R, G, B data to the CRT.

Next, an example is presented of the overall operation of the three-dimensional computer graphics system 10 as shown in FIG. 2.

In the three-dimensional computer graphics system 10, data for graphic drawing are sent to the rendering circuit 14 through the main bus 15 from the main memory 12 in the CPU 11, or from the interface circuit 13 accepting graphic indices from the outside.

Note that, when necessary, coordinate transformation, clipping, lighting, or other geometric processing is performed in the CPU 11 for the data for graphic drawing.

The polygon-rendering data S11*b* is inputted to the DDA setup circuit 141 of the rendering circuit 14.

In the DDA setup circuit 141, based upon the polygon-rendering data S11*b*, a variation data S141 is generated representing differences along the sides of a triangle and in the horizontal direction. Specifically, the desired variation of a value in the case of unit length movement is calculated by using the values of the start point, the end point, and the distance between these two points, and it is outputted to the triangle DDA circuit 142 as the variation data S141.

In the triangle DDA circuit 142, data (z, R, G, B, alpha, s, t, q) linearly interpolated in each pixel inside the triangle are calculated using the variation data S141.

Then, the data (x, y) of each vertex of the triangle and the calculated data (z, R, G, B, alpha, s, t, q) are outputted to the texture engine circuit 143 as the DDA data S142 from the triangle DDA circuit 142.

In the texture engine circuit 143, with respect to the data (s, t, q) included in the DDA data S142, the s data is divided by the q data and the t data is divided by the q data. Then, the division results s/q and t/q are multiplied by the texture sizes USIZE and VSIZE respectively to generate the texture coordinates (u, v).

Next, a request is outputted to the memory I/F circuit 144 to read data including the generated texture coordinates (u, v) from the texture engine circuit 143, and (R, G, B) data S148 stored in the SRAM 148 are read out through the memory I/F circuit 144.

Next, in the texture engine circuit 143, new (R, G, B) data is generated by multiplying one by one the (R, G, B) data in the data S148 with the (R, G, B) data in the DDA data S142 from the preceding triangle DDA circuit 142, and a pixel data S143 is generated including the generated (R, G, B) data and the (x, y, z, alpha) included in the DDA data S142.

The pixel data S143 is sent to the memory I/F circuit 144 from the texture engine circuit 143.

Next, in the memory I/F circuit 144 shown in FIG. 2, according to the control signal S11*a* from the CPU 11, for example, an operation as explained in examples 1 to 5 is carried out, and image data are written to the DRAM 147.

Further, when displaying an image on a not-shown CRT, in the CRT control circuit 145, a display address is generated in synchronization with given horizontal and vertical synchronization signals, and a request is outputted to the memory I/F circuit 144 to send the display data.

According to the request, in the memory I/F circuit 144, a fixed number of the display data is sent to the CRT control circuit 145. In the CRT control circuit 145, the display data are stored in a not-shown FIFO (First In First Out) circuit, and the RGB index values are output to the RAMDAC circuit 146 at certain time intervals.

As described above, according to the three-dimensional computer graphics system 10, by configuring the memory I/F circuit 144 of the rendering circuit 14 as shown in FIG. 3, alpha blending can be performed in the course of bitblt, and a higher speed of image processing is achievable.

Further, according to the three-dimensional computer graphics system 10, by using the memory I/F circuit 144 configured as shown in FIG. 3, an apparatus as compact as the related art is achievable.

Further, according to the three-dimensional computer graphics system 10, by providing a DRAM 147 within the rendering circuit 14, it is possible to have a broader bus width between the memory I/F circuit 144 and the DRAM 147; therefore, data transfer at a higher speed between them is achievable.

Second Embodiment

The present embodiment is related to an embodiment of the second and fourth aspects of the invention.

The three-dimensional computer graphics system of the present embodiment is basically the same as the three-dimensional computer graphics system 10 of the first embodiment as explained with reference to FIG. 2, except for the configuration of the memory I/F circuit.

Next, an explanation is made of the memory I/F circuit of the three-dimensional computer graphics system of the present embodiment.

Figure 4:
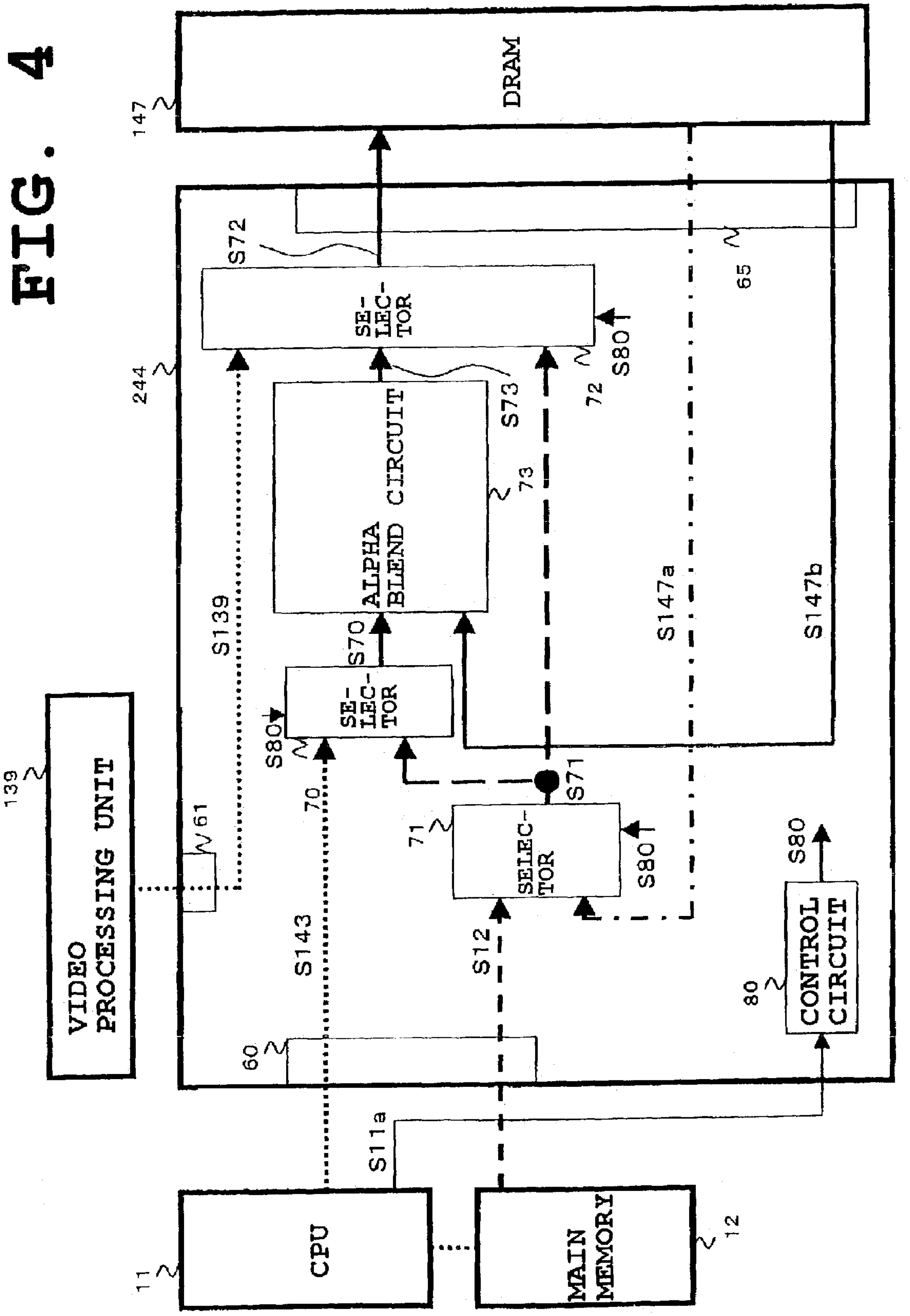
FIG. 4 is a view for explaining a configuration related to alpha blending and bit block transfer (bitblt) in a memory I/F circuit of a three-dimensional computer graphics system related to a second embodiment of the present invention.

FIG. 4 is a view for explaining a configuration associated with alpha blending and bit block transfer (bitblt) in the memory I/F circuit 244 of the present invention.

For example, as shown in FIG. 4, the memory I/F circuit 244 has I/Fs (interfaces) 60, 61, 65, selectors 70, 71, 72, an alpha blend circuit 73, and a control circuit 80.

Here, the I/F 60 corresponds to the interface, the selector 71 corresponds to the first selecting circuit, the selector 70 corresponds to the second selecting circuit, the selector 72 corresponds to the third selecting circuit, and the alpha blend circuit 73 corresponds to the image processing circuit of the present invention, respectively.

In the three-dimensional computer graphics system of the present embodiment, the same as the first embodiment, in the CPU 11, the polygon-rendering data S11*b* is generated and is inputted to the rendering circuit 14 via the main bus 15. As shown in FIG. 4, the polygon-rendering data S11*b* is then inputted to the I/F 60 of the memory I/F circuit 244 as the primitive data S143 (the first image data of the present invention) after being processed in the DDA setup circuit 141, the triangle DDA circuit 142 and the texture engine circuit 143.

The I/F 60 outputs the inputted primitive data S143 to the selector 70.

The image data S12 (that is the second image data of the present invention) read out from the main memory 12 and used for the host-local transfer is inputted to the I/F 60 via the main bus 15.

The I/F 60 outputs the inputted image data S12 to the selector 70.

According to the control signal S80 (selection signal) from the control circuit 80, the selector 71 selects either the image data S12 or the image data S147*a* read out from the DRAM 147 and used for the local transfer, and it outputs the selected image data S71 to the selector 70 and the selector 72.

The selector 70 selects either the primitive data S143 or the image data S71, and it outputs the selected image data S70 to the alpha blend circuit 73.

The alpha blend circuit 73 mixes the image data S70 inputted from the selector 70 and the destination data S147*b* read out from a write address of the DRAM 147 according to a mixing ratio given by an alpha data included in the data selected from the image data S70 and the destination data S147*b* to generate an image data S73, and it outputs the data to the selector 72.

According to the control signal S80 (selection signal), the selector 72 selects either the image data S139 inputted from the video processing unit 139 via the I/F 61 or the image data S73 inputted from the alpha blend circuit 73, and it writes the selected image data S72 to a write address of the DRAM 147 via the I/F 65.

Note that any other image processing circuits may be used to process the image (filtering) instead of the alpha blend circuit 73.

For example, according to the control signal S11$a$ from the CPU 11, the control circuit 80 controls the alpha blend circuit 73 and the selectors 70, 71, 72 to have them perform alpha blending and bitblt using the primitive data S143.

In the present embodiment, in bitblt, alpha blending using the transferred image data is performed according to the controlling operation of the control circuit 80.

The operation of the control circuit 80 will be explained in detail in connection with examples of operation of the memory I/F circuit 244.

Next, operation examples of the memory I/F circuit 244 are presented.

First Example of Operation

In this example, alpha blending using the primitive data S143 will be described.

In this example, according to the control signal S11$a$, the control circuit 80 generates a control signal S80 so that the selector 70 selects the primitive data S143, and the selector 72 selects the image data S73.

Due to this, the primitive data S143 inputted through the I/F 60 is selected by the selector 70 and is outputted to the alpha blend circuit 73 as the image data S70.

In addition, the destination data S147$b$ read out from the write address in the DRAM 147 and the alpha data are inputted to the alpha blend circuit 73.

Then, in the alpha blend circuit 73, the image data S70 and the destination data S147$b$ are mixed according to a mixing ratio given by the alpha data, and an image data S73 is generated.

Then, the image data S73 is selected by the selector 54 and is written to the write address of the DRAM 147 through the I/F 65.

Second Example of Operation

In this example, an explanation will be made of the case in which the host-local transfer from the main memory 12 to the DRAM 147 takes place without alpha blending being performed during data transfer.

The image data S12 read out from a source address for transfer in the main memory 12 is inputted to the selector 71 through the main bus 15 and the I/F 60.

The selector 71 selects the image data S12 and outputs the data to the alpha blend circuit 73 as the image data S71.

The selector 72 selects the image data S71 and writes the data to the destination address in the DRAM 147 via the I/F 65 as the image data S72.

Third Example of Operation

In this example, an explanation will be made of the case in which the host-local transfer from the main memory 12 to the DRAM 147 takes place while alpha blending is being performed during data transfer.

The image data S12 read out from a source address for transfer in the main memory 12 is inputted to the selector 71 through the main bus 15 and the I/F 60.

Then, the selector 71 selects the image data S12 and outputs the data to the selectors 70 and 72 as the image data S71.

Then, the selector 70 selects the image data S71 and outputs the data to the alpha blend circuit 73 as the image data S70.

In addition, the destination data S147$b$ read out from the write address in the DRAM 147 and the alpha data are inputted to the alpha blend circuit 73.

Then, in the alpha blend circuit 73, the image data S70 and the destination data S147$b$ are mixed according to a mixing ratio given by the alpha data, and an image data S73 is generated.

Then, the image data S73 is selected by the selector 72 and is written to the write address of the DRAM 147 through the I/F 65.

As a result, when image data are transferred from the main memory 12 to the DRAM 147, alpha blending can be performed for both the source image data and the destination data.

Fourth Example of Operation

In this example, an explanation will be made of the case in which data transfer within the DRAM 147 takes place without alpha blending being performed during data transfer.

The image data S147$a$ read out from a source address for transfer in the DRAM 147 is inputted to the selector 71 through the I/F 65.

The selector 71 selects the image data S147$a$ and outputs the data to the selectors 70 and 71 as the image data S71.

Then, the selector 72 selects the image data S71 and writes the data to the destination address in the DRAM 147 via the I/F 65.

Fifth Example of Operation

In this example, an explanation will be made of the case in which data are transferred within the DRAM 147 while alpha blending is being performed.

The image data S147$a$ read out from a source address for transfer in the DRAM 147 is inputted to the selector 71 through the I/F 65.

Then, the selector 71 selects the image data S147$a$ and outputs the data to the selectors 70 and 72 as the image data S71.

Then, the selector 70 selects the image data S71 and outputs the data to the alpha blend circuit 73 as the image data S70.

In addition, the destination data S1147$b$ read out from the write address (destination address) in the DRAM 147 and the alpha data are inputted to the alpha blend circuit 73.

Then, in the alpha blend circuit 73, the image data S70 and the destination data S147$b$ are mixed according to a mixing ratio given by the alpha data, and an image data S73 is generated.

Then, the image data S73 is selected by the selector 72 and is written to the write address of the DRAM 147 through the I/F 65.

As a result, when image data are transferred within the DRAM 147, alpha blending can be performed for both the source image data and the destination data.

The overall operation of the three-dimensional computer graphics system of the present embodiment is the same as that of the three-dimensional computer graphics system 10 described in the first embodiment, except for the memory I/F circuit 244.

As shown above, according to the three-dimensional computer graphics system of present embodiment, the same effects as that of the first embodiment can be obtained.

Summarizing the effects of the present invention, as shown above, according to the image processing apparatus of the present invention, image processing of the image data being transferred can be performed selectively in the course of bitblt, and a higher speed of image processing is achievable.

While the invention has been described with reference to specific embodiments chosen for the purpose of illustration, it should be apparent that numerous modifications could be made thereto by those skilled in the art without departing from the basic concept and scope of the invention.

What is claimed is:

1. An image processing apparatus comprising a first interface for inputting a first image data from a calculation processing circuit outside a semiconductor chip, and inputting a second image data from an external storage circuit outside the semiconductor chip, a semiconductor storage circuit, a selecting circuit for selecting and outputting one of the first image data, the second image data, and a third image data read from the semiconductor storage circuit, an image processing circuit for selecting and performing either processing the image data inputted from the selecting circuit to generate and output an image data, or outputting an image data inputted from the selecting circuit, and a second interface for outputting the image data from the image processing circuit to the semiconductor storage circuit;

wherein the first interface, the semiconductor storage circuit, the selecting circuit, the image processing circuit, and the second interface are formed in the same semiconductor chip.

2. An image processing apparatus as set forth in claim 1, further comprising a controlling circuit for controlling the selecting circuit to select the first image data, and the image processing circuit to process the first image data, when the first image data is processed and written to the semiconductor storage circuit.

3. An image processing apparatus as set forth in claim 1, further comprising a controlling circuit for controlling the selecting circuit to select the second image data, and the image processing circuit to output the second image data inputted from the selecting circuit, when an image data is transferred from the external storage circuit to the semiconductor storage circuit without image processing being performed during data transfer.

4. An image processing apparatus as set forth in claim 1, further comprising a controlling circuit for controlling the selecting circuit to select the second image data, and the image processing circuit to process and output the second image data inputted from the selecting circuit, when an image data is transferred from the external storage circuit to the semiconductor storage circuit while image processing is being performed during data transfer.

5. An image processing apparatus as set forth in claim 1, further comprising a controlling circuit for controlling the selecting circuit to select the third image data, and the image processing circuit to output the third image data inputted from the selecting circuit, when image data is transferred within the semiconductor storage circuit without image processing being performed during data transfer.

6. An image processing apparatus as set forth in claim 1, further comprising a controlling circuit for controlling the selecting circuit to select the second image data, and the image processing circuit to process and output the second image data inputted from the selecting circuit, when image data is transferred from the external storage circuit to the semiconductor storage circuit when image processing is being performed during data transfer.

7. An image processing apparatus as set forth in claim 1, wherein the second interface inputs an image data read from a write address of the semiconductor storage circuit and outputs the same data to the image processing circuit, the image processing circuit performs image processing using the image data inputted from the second interface and the image data inputted from the selecting circuit, and generates and outputs an image data.

8. An image processing apparatus as set forth in claim 7, wherein the image processing circuit performs alpha blending using the image data inputted from the selecting circuit and the image data inputted from the second interface.

9. An image processing apparatus as set forth in claim 1, further comprising a texture processing circuit for texture processing of the image data outputted from the calculation processing circuit, and outputting the image data as the first image data to the first interface.

10. An image processing apparatus comprising an interface for inputting a first image data from a calculation processing circuit outside a semiconductor chip, and inputting a second image data from an external storage circuit outside the semiconductor chip, a semiconductor storage circuit, a first selecting circuit for selecting and outputting either the second image data or a third image data read from the semiconductor storage circuit, a second selecting circuit for selecting and outputting either the first image data, or the image data selected by the first selecting circuit, an image processing circuit for processing the image data inputted from the second selecting circuit and generating an image data, and a third selecting circuit for selecting and outputting either the image data generated by the image processing circuit, or the image data selected and outputted by the first selecting circuit;

wherein the interface, the semiconductor storage circuit, the first selecting circuit, the second selecting circuit, the third selecting circuit, and the image processing circuit are formed in the same semiconductor chip.

11. An image processing apparatus as set forth in claim 10, wherein the image processing circuit performs image processing using the image data read from a write address of the semiconductor storage circuit and the image data inputted from the second interface, and generates and outputs an image data.

12. An image processing apparatus as set forth in claim 11, wherein the image processing circuit performs alpha blending.

13. An image processing apparatus as set forth in claim 10, further comprising a texture processing circuit for texture processing of the image data generated by the calculation processing circuit, and outputting the image data as the first image data to the interface.

14. An image processing apparatus comprising a calculation processing circuit, an external storage circuit, and a rendering circuit, wherein, the rendering circuit comprises a first interface for inputting a first image data from the calculation processing circuit, and inputting a second image data from the external storage circuit, a semiconductor storage circuit, a selecting circuit for selecting and outputting one of the first image data, the second image data, and a third image data read from the semiconductor storage circuit, an image processing circuit for selecting and performing either processing the image data inputted from the selecting circuit to generate and output an image data, or outputting an image data inputted from the selecting circuit, and a second interface for outputting the image data from the image processing circuit to the semiconductor storage circuit; wherein the first interface, the semiconductor storage circuit, the selecting circuit, the image processing circuit, and the second interface are formed in the same semiconductor chip.

15. An image processing apparatus comprising a calculation processing circuit, an external storage circuit, and a rendering circuit, wherein, the rendering circuit comprises an interface for inputting a first image data from the calculation processing circuit, and inputting a second image data from the external storage circuit, a semiconductor storage circuit, a first selecting circuit for selecting and outputting either the second image data, or a third image data read from the semiconductor storage circuit, a second selecting circuit for selecting and outputting either the first image data, or the image data selected by the first selecting circuit, an image processing circuit for processing the image data inputted from the second selecting circuit and generating an image data, and a third selecting circuit for selecting and outputting either the image data generated by the image processing circuit, or the image data selected and outputted by the first selecting circuit; wherein the interface, the semiconductor storage circuit, the first selecting circuit, the second selecting circuit, the third selecting circuit, and the image processing circuit are formed in the same semiconductor chip.

* * * * *